(12) United States Patent
Joshi et al.

(10) Patent No.: US 6,353,738 B1
(45) Date of Patent: Mar. 5, 2002

(54) METHOD FOR IMPLEMENTING A TERMINAL-TO-TERMINAL CALL WITH AN OPTIMAL USE OF RADIO RESOURCES IN A MOBILE SATELLITE SYSTEM

(75) Inventors: Chandra Joshi, Gaithersburg, MD (US); Anthony Noerpel, Lovettsville, VA (US); Chi-Jiun Su, Derwood, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/247,845

(22) Filed: Feb. 11, 1999

Related U.S. Application Data
(60) Provisional application No. 60/110,251, filed on Nov. 30, 1998.

(51) Int. Cl.[7] ................................................. H04Q 7/20
(52) U.S. Cl. ........................ 455/427; 455/427; 455/428; 455/430; 455/445; 455/450; 455/515
(58) Field of Search ................................. 370/360, 323, 370/522; 455/427, 428, 430, 432, 433, 435, 445, 450, 12.1, 13.1, 13.2, 515

(56) References Cited

U.S. PATENT DOCUMENTS

| | | | | |
|---|---|---|---|---|
| 5,439,190 A | * | 8/1995 | Horstein et al. ............... | 379/59 |
| 5,526,404 A | | 6/1996 | Wiedeman et al. ............ | 379/60 |
| 5,551,624 A | * | 9/1996 | Horstein et al. ............. | 342/356 |
| 5,572,674 A | * | 11/1996 | Ernst ........................ | 395/200.1 |
| 5,594,780 A | | 1/1997 | Wiedeman et al. ............ | 379/59 |
| 5,664,006 A | | 9/1997 | Monte et al. ................ | 455/405 |
| 5,689,568 A | * | 11/1997 | Laborde ..................... | 455/12.1 |
| 5,713,075 A | | 1/1998 | Threadgill et al. ........... | 455/427 |
| 5,715,297 A | | 2/1998 | Wiedeman .................... | 379/60 |
| 5,781,540 A | * | 7/1998 | Malcolm et al. ............. | 370/321 |
| 5,790,939 A | * | 8/1998 | Malcolm et al. ............ | 455/13.2 |
| 5,809,141 A | | 9/1998 | Dent et al. | |
| 5,822,311 A | | 10/1998 | Hassan et al. ............... | 370/322 |
| 5,825,889 A | | 10/1998 | Dent et al. | |
| 5,842,125 A | | 11/1998 | Modzelesky et al. ........ | 455/426 |
| 5,850,602 A | | 12/1998 | Tisdale et al. .............. | 455/430 |
| 5,884,142 A | * | 3/1999 | Wiederman et al. ........ | 455/12.1 |
| 5,943,324 A | * | 8/1999 | Ramesh et al. .............. | 370/321 |
| 5,949,776 A | * | 9/1999 | Mahany et al. .............. | 370/338 |
| 5,956,646 A | * | 9/1999 | Kolev et al. ................ | 455/502 |
| 5,974,092 A | * | 10/1999 | Roos et al. .................. | 375/272 |
| 6,052,364 A | * | 4/2000 | Chalmers et al. ........... | 370/312 |
| 6,061,562 A | * | 5/2000 | Martin et al. ................ | 455/431 |
| 6,081,709 A | * | 6/2000 | Karabinis ................... | 455/427 |
| 6,108,318 A | * | 8/2000 | Kolev et al. ................ | 370/323 |
| 6,154,452 A | * | 11/2000 | Marko et al. ............... | 370/321 |
| 6,198,921 B1 | * | 3/2001 | Youssefzadeh et al. ..... | 455/428 |

FOREIGN PATENT DOCUMENTS

EP    0 828 353 A2    11/1998

* cited by examiner

Primary Examiner—Daniel Hunter
Assistant Examiner—Yemane Woldetatios
(74) Attorney, Agent, or Firm—John T. Whelan; Michael W. Sales

(57) ABSTRACT

An MSAT system is provided which optimizes satellite resources when implementing a single-hop TtT call. The system allocates satellite channels and signaling channels for a single-hop TtT call to the participating terminals at an early stage during the call set-up procedure such that only a single pair of satellite channels are assigned to each of the terminals for call establishment and for use during the call, as opposed to two pairs of satellite channels. A test message for signaling channel (e.g., TTCH) validation is transmitted from the network (e.g., from a gateway station controller) to each of the terminals.

23 Claims, 3 Drawing Sheets

METHOD FOR IMPLEMENTING A TERMINAL-TO-TERMINAL CALL WITH AN OPTIMAL USE OF RADIO RESOURCES IN A MOBILE SATELLITE SYSTEM

CROSS REFERENCE TO RELATED APPLICATIONS

Related subject matter is disclosed and claimed in co-pending U.S. patent application Ser. No. 09/115,098, filed by Chandra Joshi et al. on Jul. 13, 1998; in co-pending U.S. patent application Ser. No. 09/247,847, tiled by Chandra Joshi et al. on Feb. 11, 1999; and in co-pending U.S. patent application Ser. No. 09/247,848, filed by Chandra Joshi et al. on Feb. 11, 1999: all of said applications being expressly incorporated herein by reference.

This application claims priority to U.S. Provisional patent application Ser. No. 60/110,251 of Chandra Joshi et al., filed Nov. 30, 1998, for "A Method for Implementing a Terminal-To-Terminal Call in a Geo-Stationary Orbit Mobile Satellite System", incorporated herein by reference.

FIELD OF THE INVENTION

The invention relates to a method for implementing single-hop terminal-to-terminal connections with the optimal use of the resources in a geosynchronous mobile satellite system. The invention further relates to a system for providing a direct single-hop communication link between two mobile users with the optimal use of satellite resources.

BACKGROUND OF THE INVENTION

A number of systems exist which provide both mobile terrestrial communication (i.e., cellular communication) and mobile satellite communication between terminals. Such a system is hereinafter referred to as an MSAT system. Satellite communication between two terminals is typically implemented via a double-hop, that is, two signal paths. One signal path is from an originating terminal to a ground station via a satellite, and the other signal path is from the ground station to a destination terminal via the satellite. In a mobile satellite system with a geosynchronous earth orbit satellite, if a connection is established between two mobile users through a gateway station, and two satellite hops are used, the delay from one user to the other user will be approximately 540 milliseconds (ms), which is generally unacceptable for voice communication.

A number of single-hop MSAT systems also exist; however, these systems are disadvantageous because they do not provide for a signaling channel between the originating and terminating terminals and a gateway station during a single-hop, terminal-to-terminal call. The MSAT system described in the aforementioned U.S. patent application of Chandra Joshi for "A Mobile Satellite System and Method for Implementing A Single-Hop Terminal-to-Terminal Call", which is incorporated herein by reference, provides such a signaling channel between the originating terminal and the terminating terminal and a gateway station controller at the gateway station with which they are both registered. To establish a terminal-to-terminal call in this system, two traffic channels are used for each terminal. For each of the participating terminals in a terminal-to-terminal (ftT) call, a first pair of satellite channels are used by the terminals to set-up the TtT call. Once the direct satellite link has been established and the terminals have been assigned to the corresponding cross-connected satellite channels, the original pair of satellite channels are released.

SUMMARY OF THE INVENTION

In accordance with the present invention, an MSAT system is provided which optimizes satellite resources when implementing a single-hop TtT call. The MSAT system improves the voice quality of a terminal-to-terminal (Ttl) call by providing a connection with a single satellite hop, thereby reducing the aforementioned propagation delay to approximately 270 ms. The MSAT system requires only one pair of traffic channels, thereby optimizing the use of satellite resources and, at the same time, offering the same voice quality as an MSAT system which employs the use of two pairs of traffic channels for call set-up.

In accordance with an aspect of the present invention, satellite channels for the call path and a signaling channel during a single-hop TtT call are assigned to the participating terminals at an earlier stage during the call set-up procedure than in an MSAT system employing two pairs of satellite channels. Thus, only a single pair of satellite channels are assigned to the terminals for both call establishment and the call path during the TtT call, as opposed to two pairs of satellite channels.

In accordance with another aspect of the present invention, a test message for signaling channel (e.g., TTCH) validation is transmitted from the network (e.g., from a gateway station controller) to each of the terminals.

In accordance with yet another aspect of the present invention, the network issues the TTCH test message on a Radio Resource layer message for transmission to each terminal on its assigned satellite channel for signaling during the TtT call. The terminals repeat the message on the assigned satellite channels for call traffic (e.g., a traffic channel (CH)) to the network.

In accordance with another aspect of the present invention, the MSAT system performs another channel assignment procedure if a direct satellite communication link (e.g., an L-L link) cannot be successfully established between the participating terminals.

BRIEF DESCRIPTION OF DRAWINGS

The various aspects, advantages and novel features of the present invention will be more readily comprehended from the following detailed description when read in conjunction with the appended drawings, in which.

Throughout the drawing figures, like reference numerals will be understood to refer to like parts and components.

DETAILED DESCRIPTION OF THE PREFERRED EMBODIMENTS

Figure 1:
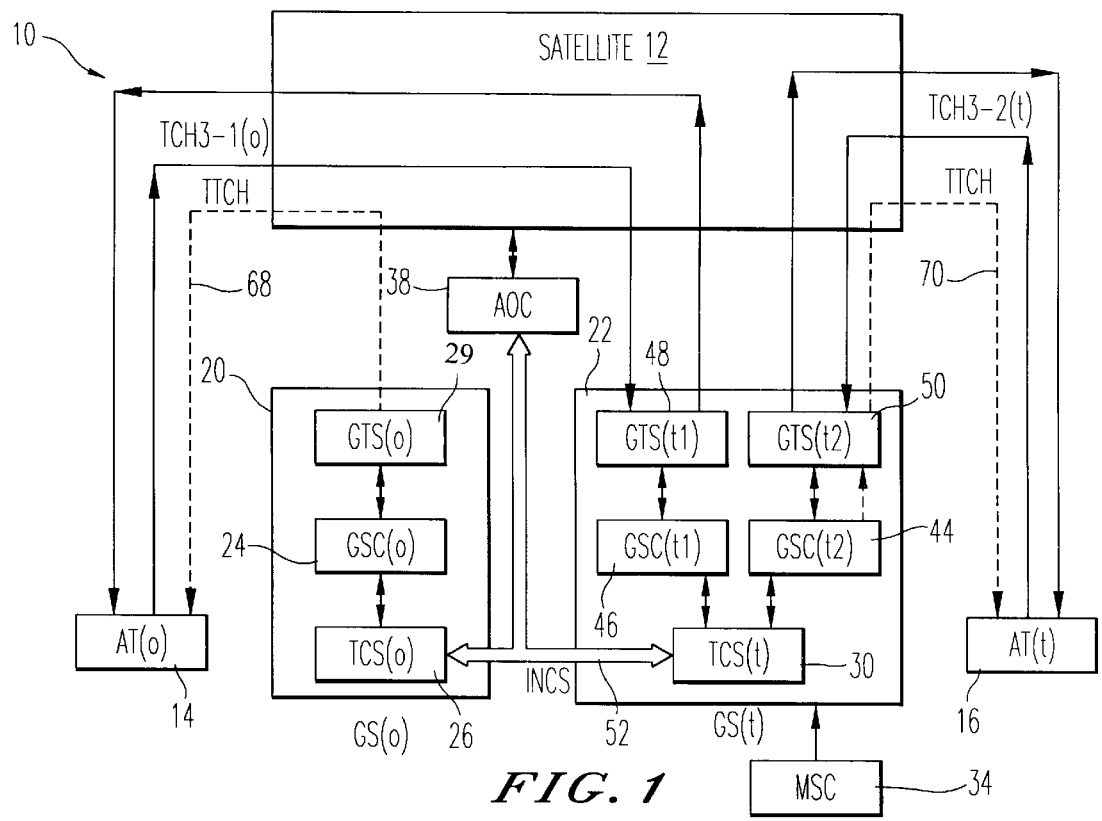
FIG. 1 is a block diagram illustrating an MSAT system implementing a single-hop terminal-to-terminal (TtT) call set-up procedure in accordance with an embodiment of the present invention.

An MSAT system 10 constructed in accordance with the present invention is depicted in FIG. 1. The MSAT system 10 is a fully integrated digital mobile communications network which is interoperable with terrestrial cellular networks. The MSAT system 10 comprises at least one satellite 12 which preferably a geosynchronous satellite.

The MSAT system 10 provides an open common air interface to allow access terminals such as AT(o) 14 and AT(t) 16 to communicate via the satellite 12. The air interface can be, for example, an L-band mobile radio link. The access terminals (ATs) can be hand-held terminals, vehicular terminals or fixed terminals. In addition, the ATs can be dual-mode terminals to operate in either of the MSAT system or a Global System for Mobile Communications or GSM-standard digital cellular system. The MSAT system 10 provides subscriber services that are essentially those services available from a GSM-based digital cellular system, including voice, data, facsimile, voice mail and short message service, among other services.

Figure 2:
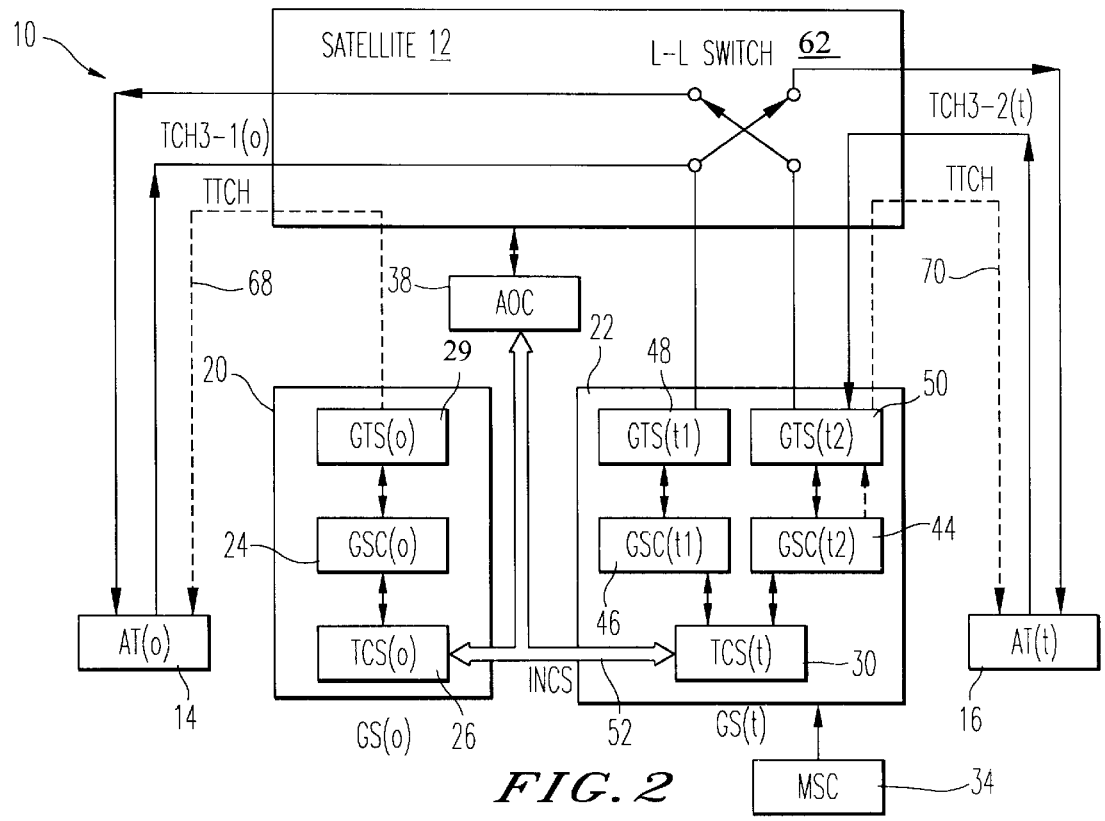
FIG. 2 is a block diagram illustrating an MSAT system implementing a TtT single-hop call in accordance with an embodiment of the present invention.

With continued reference to FIG. 1, the MSAT system 10 further comprises a number of gateway stations (e.g., GS(o) 20 and GS(t) 22). The gateway stations (GSs) provide an interface between the public switched telephone network (PSTN), the public land mobile network (PLMN), and the public switched data network (PSDN) and the ATs using the satellite 12 as repeater. As stated previously, the GSs also have interfaces for cooperating cellular networks for interoperability. Thus, ATs communicate over the satellite with devices in the PSTN, PLMN and the PSDN via GSs and with each other under the control of GSs, as described in further detail below. The GSs preferably communicate via C-band satellite links. Single-hop and double-hop mobile TtT calls via the satellite are preferably implemented via L-band paths. For a single-hop direct connection or TtT call between access terminals, a cross-connected pair of L-band channels are used, as shown in FIG. 2, and are hereinafter referred to as an L-L link 62.

A satellite operations center (not shown) provides satellite telemetry, command and ranging and payload housekeeping functions. An advanced operations center (AOC) 38 communicates with the satellite operations center, as well as with the GSs. Each GS manages a subset of the satellite resources (i.e., switched channels) and can request additional resources from the AOC 38 as required.

The MSAT system 10 architecture is based on the GSM standard. Each GS preferably comprises at least one gateway station controller (GSC), a traffic control subsystem (TCS), and at least one gateway transceiver station (GTS). For illustrative purposes, an originating GS (i.e., GS(o) 20) comprises a GSC and a TCS which are hereinafter referred to as GSC(o) 24 and TCS(o) 26, respectively. The GS(o) 20 also comprises a transceiver GTS(o) 29. A terminating GS (i.e., GS(t) 22) comprises two GTSs, that is, GTS(t1) 48 and GTS(t2) 50, as well as two GSCs hereinafter referred to as GSC(t1) 46 and GSC(t2) 44. The GSC(t1) 46 and GSC(t2) 44 operate in conjunction with an MSC 34. The MSC 34 communicates with a home location register (HLR) in a conventional manner. The GSC and GTS manage an interface (i.e., an A-interface) toward a MSC 34. The GTS provides the common air interface with the ATs. The TCS provides for the allocation/deallocation of the radio resources to the AT via communication with the GSC/GTS. The TCS can support a number of GSCs in a GS, as illustrated in FIG. 1 by the TCS(t) 30 and the GS(t) 22 which comprises GSC(t1) 46 and GSC(t2) 44. The allocation of satellite resources by the AOC and GSs is communicated via an intranetwork communication system (INCS) 52.

As stated previously, a TtT call in the MSAT system 10 can be established in either single-hop mode or double-hop mode. The single-hop mode call is preferably only to established for a voice call since the aforementioned propagation delay can degrade voice calls more than data calls. In this mode, two ATs engaged in a voice call communicate directly via satellite 12, on a circuit-switched L-L channel 62 at the satellite 12. The TtT double-hop mode call is established between two ATs for data, facsimile, and some voice calls when the ATs are in geographically restricted positions. The MSAT system 10 supports a single-hop call for terminals even if both of the terminals are roaming in the MSAT system.

The MSAT system 10 establishes a single-hop call between two ATs for a voice call if both ATs are registered at the same MSC. For illustrative purposes and with continued reference to FIG. 1, the originating AT(o) 14 is initially registered at a gateway station GS(o) 20 which is different from the GS(t) 22 where the terminating AT(t) 16 is initially registered. The AT(o) 14 communicates with the GS(o) 20 initially and then with the GS(t) 22 after the AT(o) 14 receives timing correction from the GS(o) 20. After the initial access and commencement of signaling, the downlink channel TTCH 68 from the network (i.e., the MSAT 10) to the AT(o) 14 comes from GS(o) 20 instead of GS(t) 22 to which the AT(o) is transmitting, as illustrated in FIG. 2.

In accordance with the present invention, the MSAT system 10 provides for the establishment of a single-hop TtT call with the optimal use of the network resources. The MSAT system 10 employs the assignment of TTCH channels 68 and 70 and traffic channels TCH3-1(o) and TCH3-2(t) to the AT(o) 14 and the AT(t) 16, respectively, at the initial access procedure of the call, as shown in FIG. 1. The MSAT system 10 validates the assignment of the TTCHs 68 and 70 during an early phase of the signaling procedure. The early assignment of a TTCH and its verification allows the MSAT system and the ATs 14 and 16 to have a reliable communication link at the time of the cross-connection the existing L-L channels TCH3-1(o) and TCH3-2(t) at the satellite.

Figure 3A:
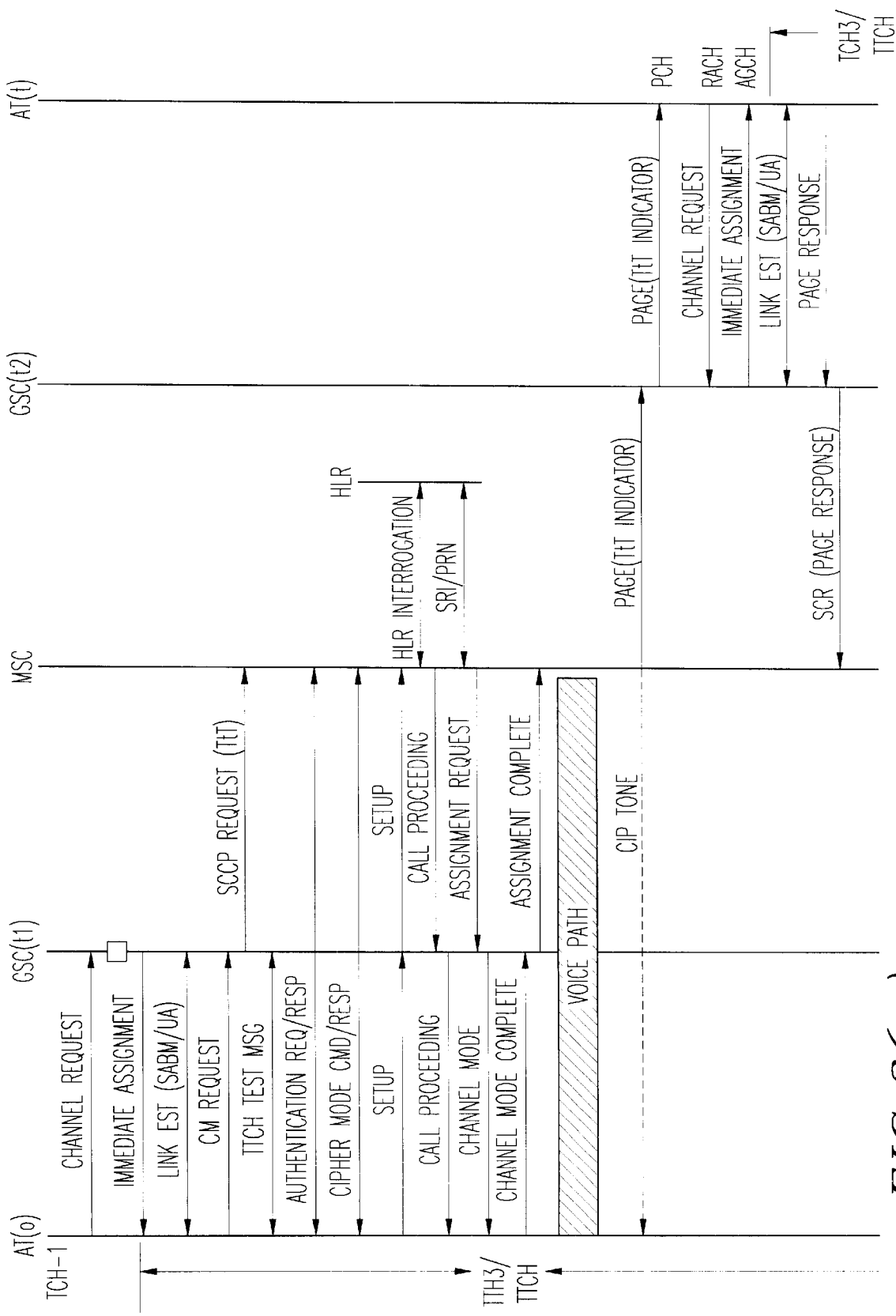
FIG. 3 illustrates signals transmitted between MSAT system components to implement a single-hop TtT call in accordance with an embodiment of the present invention.
Figure 3B:
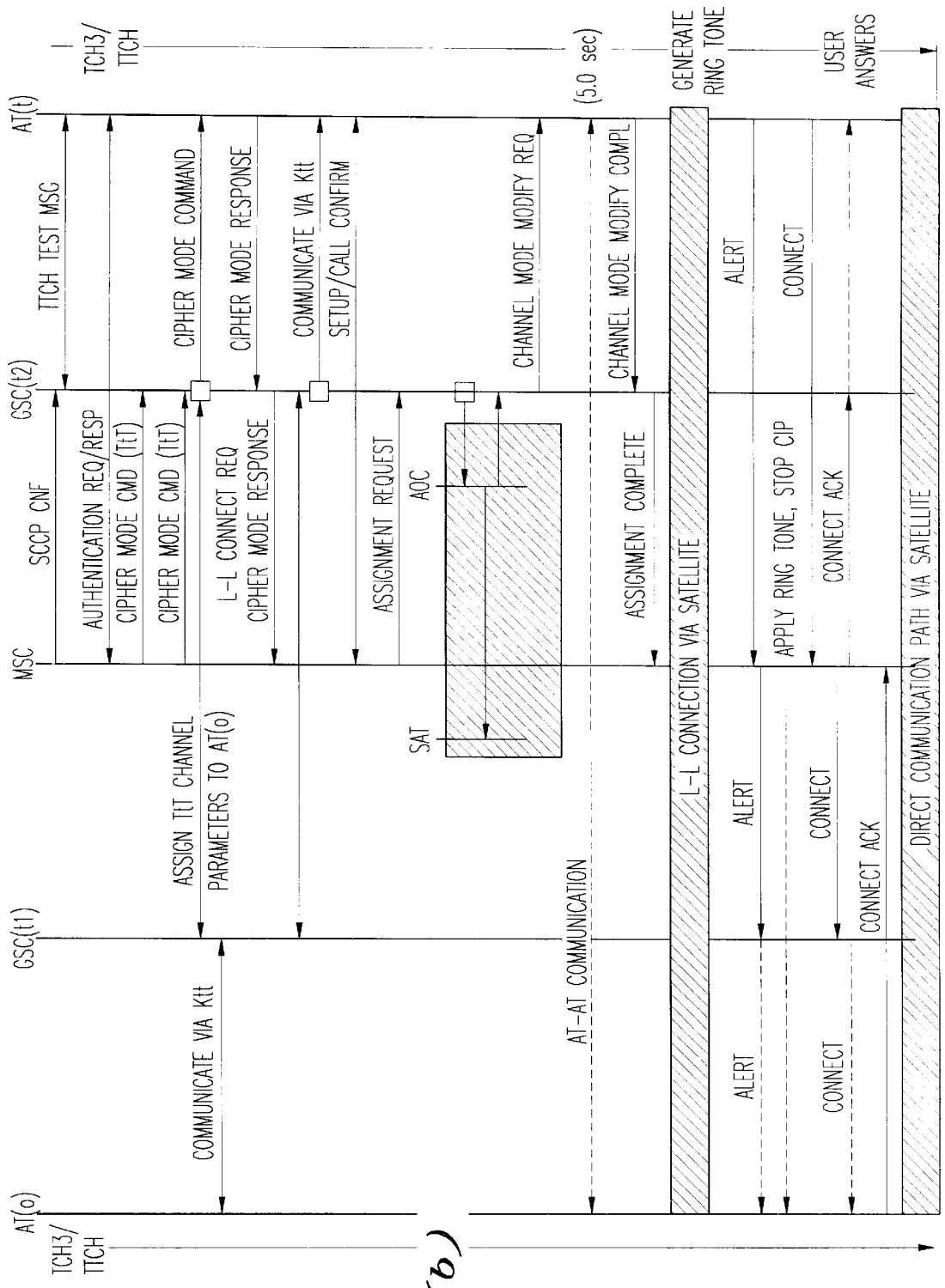

Signaling between system components (i.e., the AT(o) 14, the GSC(t1) 46, the MSC 34, the GSC(t2) and the AT(t) 16) and the TtT call path are illustrated in FIGS. 3(a) and 3(b). The signaling that is similar with respect to an MSAT system employing two pairs of satellite channels for the signaling and call path associated with a single-hop call is described in the co-pending application. The signaling that is unique to the MSAT system 10 of the present invention for establishing a single-hop call with only one pair satellite channels per AT will now be described.

The AT(o) 14 requests for the channel TCH3-1(o) a random access channel (RACH) message which includes the called party number, Global Positioning System (GPS) information and so on. The GS(o) 20 recognizes that a TtT call has been requested and assigns the TCH3-1(o), along with the TTCH 68. During the signaling phase of the call on both originating and terminating sides, the MSAT system 10 performs a validation test on the assigned TTCH channels 68 and 70 prior to their use. The network issues a validation Radio Resource (RR) layer message (i.e., TTCH TEST MSG) on the assigned TTCH to each AT (i.e., AT(o) 14 and AT(t) 16). In response to the message, each AT echoes the received message to network on the corresponding assigned TCH channels, that is, on TCH3-1(o) and TCH3-2(t), respectively.

On the originating side, the AT(o) 14 provides the called party number to the network at the initial access procedure. The TCS(o) 26 determines the type of the call by analyzing the called party number. If the call is a TtT call, the TCS(o) 26 assigns TCH3-1(o) and TTCH 68 to the AT(o) 14. On terminating side, the MSC 34 includes an indication of a TtT call in the PAGE message. If PAGE message contains a TtT indication, the AT(t) 16 echoes the TtT indication in the RACH message. The TCS(t) 30 determines the type of the call by checking TtT indicator bit in the RACH message.

On both sides, the TTCH validation procedure is initiated by the MSAT system 10.

The MSAT system 10 starts the TTCH validation procedure by establishing a logical link with each AT (i.e., AT(o) 14 and AT(t) 16). Then, the RR layer of the network issues a TTCH validation message and the Data Link layer of the network transfers it to the AT(o) 14 and the AT(t) 16 on the assigned TTCH 68 and 70, respectively. Each AT validates the TTCH by echoing the received message to the network via the corresponding assigned TCH channel. The receipt of the same message by the network completes the validation of the TTCH.

When the GSC(t2) 44 receives the CIPHER MODE COMMAND with TtT container from the MSC 34, as indicated in FIG. 3(*a*), the GS(t2) 44 requests the TCS(t) 30 for the transfer of the TtT parameters to both the AT(o) 14 and the AT(t) 16. The transfer of the TtT parameters takes place in the existing ciphered modes which use two independent keys, Kc1 and Kc2. Then, ciphered mode with the existing ciphering keys (Kc1, Kc2) is changed to ciphered mode with the common ciphering key Ktt, as indicated by "COMMUNICATE VIA Ktt").

At this point during the call set-up stage, since the L-L channel 62 is not connected at the satellite 12, each AT (i.e., AT(o) 14 and AT(t) 16) and the network are fully connected on the TCH channels (e.g., TCH3-1(o) and TCH3-2(t)). In other words, the AT(o) 14 remains capable of listening to any voice, and call progress activity received from the MSC 34, via the TCH. At the same time, the AT(o) 14 can receive any signaling message from the network on the TTCH 68, as indicated in FIG. 1.

Upon the receipt of the ASSIGNMENT message on the terminating side, the GSC(t2) 44 requests the Advanced Operation Center (AOC) 38 to connect L-L channel 62 at the satellite as shown in FIG. 2. The GSC(t2) 44 then initiates CHANNEL MODE MODIFY procedure with the AT(t) 16. During this procedure, the AT(t) 16 performs the verification of the L-L connection 62 at the satellite 12. The terminating AT(t) 16 sends a test message (i.e., to the originating AT(o) 14). Upon receipt of the response from the originating terminal AT(o) 14, the AT(t) 16 sends a CHANNEL MODE MODIFY COMPLETE to the GSC(t2) 44.

If the AT(t) 16 is able to communicate with the AT(o) 14, the AT(t) 16 generates a ring tone and sends an ALERT message to the MSC 34. Upon receipt of the ALERT message from the AT(t) 16, the MSC 34 sends an ALERT message to the AT(o) 14 via the TCH (i.e., TCH 3-2(t)) and applies the Ring back tone. At some time later, the AT(t) user answers the call, and the AT(t) sends the CONNECT message to the MSC 34.

If the AT(t) fails to communicate with AT(o), it will not generate a ring tone and sends a CHANNEL MODE MODIFY ACKNOWLEDGE message with a failure indication message to the network. Upon receipt of this message from the AT(t), the network initiates the call procedure for a double hop call. In this procedure, the network assigns a new TCH channel to each AT. On the assignment of the new TCH channel, the AT(t) generates an ALERT message and local ringing indication to the user. At some time later, the AT(t) user answers the call and the AT(t) sends the CONNECT to the MSC.

The present invention uses only a single pair of traffic channels per AT and provides the same voice quality as a system which uses two pairs of traffic channels per AT. Since the radio resources are the source of revenue in a mobile satellite system, the MSAT system of the present invention is advantageous since it optimizes the use of resources.

Although the present invention has been described with reference to a preferred embodiment thereof, it will be understood that the invention is not limited to the details thereof. Various modifications and substitutions have been suggested in the foregoing description, and others will occur to those of ordinary skill in the art. All such substitutions are intended to be embraced within the scope of the invention as defined in the appended claims.

What is claimed is:

1. A method of implementing a single-hop terminal-to-terminal call in a mobile satellite system which optimizes the use of satellite resources comprising satellite channels, the method comprising the steps of:

receiving a called party number at a gateway station from an originating terminal;

determining from said called party number that a terminal-to-terminal call is being requested; and assigning said originating terminal a first satellite channel with which to communicate with said mobile satellite system, and a second satellite channel for signaling from said gateway station to said originating terminal during said terminal-to-terminal call using a single hop if a terminal-to-terminal call is requested, said first satellite channel also being used for signaling to establish said terminal-to-terminal call.

2. A method as claimed in claim 1, further comprising the step of transmitting a signaling channel test message from said gateway station to said originating terminal.

3. A method as claimed in claim 2, wherein said transmitting step comprises the step of transmitting said signaling channel test message from said gateway station to said originating terminal via said second satellite channel.

4. A method as claimed in claim 3, further comprising the step of transmitting a response to said signaling channel test message from said originating terminal to said gateway station via said first satellite channel.

5. A method as claimed in claim 1, further comprising the step of establishing a direct L-L satellite communication link comprising said first satellite channel between said originating terminal and a device corresponding to said called party number, said originating terminal being operable to listen to a call path between said originating terminal and a mobile switching center connected to said gateway station via said first satellite channel and to receive signaling messages transmitted thereto via said second satellite channel.

6. A method as claimed in claim 5, wherein said device is registered with a second gateway station, said method comprising the step of reregistering said originating terminal with said second gateway station.

7. A method as claimed in claim 5, further comprising the steps of:

assigning a third satellite channel to said device; and cross-connecting said first satellite channel and said third satellite channel to create said direct satellite communication link.

8. A method as claimed in claim 7, further comprising the step of transmitting a first message between said originating terminal and said device via said direct satellite communication link to verify connection thereof.

9. A method as claimed in claim 8, further comprising the step of transmitting a command from said gateway station to said device to change the mode of said device from using said third satellite channel for signaling to establish said terminal-to-terminal call to using said third satellite channel as a call path for said terminal-to-terminal call.

10. A method as claimed in claim 9, wherein said gateway station transmits a second message to said device indicating that channel mode modification is complete if one of said device and said originating terminal responds to said first message via said direct satellite communication link.

11. A method as claimed in claim 8, further comprising the step of reassigning satellite channels to said originating terminal and said device for signaling to set-up and participate in said terminal-to-terminal call and to provide signaling during said terminal-to-terminal if connection of said direct satellite communication link is not verified.

12. A method as claimed in claim 7, wherein said assigning step for assigning said third satellite channel further comprises the step of assigning said device a fourth satellite channel for signaling from said gateway station to said device during said terminal-to-terminal call, said third satellite channel being used to communicate with said mobile satellite network and for signaling to establish said terminal-to-terminal call.

13. A method as claimed in claim 7, wherein said assigning step for assigning said third satellite channel further comprises the steps of:
    assigning said device a fourth satellite channel for signaling from said gateway station to said device during said terminal-to-terminal call; and
    transmitting a signaling channel test message from said gateway station to said device.

14. A method as claimed in claim 13, wherein said transmitting step comprises the step of transmitting said signaling channel test message from said gateway station to said device originating terminal via said second satellite channel.

15. A method as claimed in claim 14, further comprising the step of transmitting a response to said signaling channel test message from said device to said gateway station via said fourth satellite channel.

16. A method as claimed in claim 7, further comprising the step of switching said originating terminal and said device from ciphered modes of communication with respect to said gateway station using independent cipher keys to a ciphered mode using a cipher key common to said originating terminal and said device.

17. A method as claimed in claim 16, wherein said switching step occurs prior to said cross-connecting step.

18. A method of implementing a single-hop terminal-to-terminal call in a mobile satellite system which optimizes the use of satellite resources comprising satellite channels, the method comprising the steps of:

receiving a signal from a gateway station that a terminal-to-terminal call is being requested with a device registered with said gateway station; and
    assigning said device a first satellite channel with which to communicate with said mobile satellite system, and a second satellite channel for signaling from said gateway station to said device during said terminal-to-terminal call using a single hop, said first satellite channel also being used for signaling to establish said terminal-to-terminal call.

19. A method as claimed in claim 18, further comprising the step of transmitting a signaling channel test message from said gateway station to said device.

20. A method as claimed in claim 19, wherein said transmitting step comprises the step of transmitting said signaling channel test message from said gateway station to said device via said second satellite channel.

21. A method as claimed in claim 20, further comprising the step of transmitting a response to said signaling channel test message from said device to said gateway station via said first satellite channel.

22. A data signal embodied in a carrier wave having at least one of a plurality of segments comprising a first segment identifying a first satellite channel to be used for communication between a mobile access terminal and a mobile satellite system, and a second segment identifying a second satellite channel for signaling from a gateway station in said mobile satellite system to said mobile access terminal during a terminal-to-terminal call using a single hop, said first satellite channel also being used for signaling to establish said terminal-to-terminal call.

23. A mobile satellite system for implementing a single-hop terminal-to-terminal call between terminals which optimizes the use of satellite resources comprising satellite channels, comprising:
    a gateway station configured to communicate with one of said terminals via said satellite and operable to determine if a called party number received from said terminal indicates that a terminal-to-terminal call is being requested, and assign said terminal a first satellite channel with which to communicate with said gateway station, and a second satellite channel for signaling from said gateway station to said terminal during said terminal-to-terminal call using a single hop if a terminal-to-terminal call is requested, said gateway station also using said first satellite channel for signaling to establish said terminal-to-terminal call.

* * * * *